(12) United States Patent
Hunt et al.

(10) Patent No.: US 8,255,126 B2
(45) Date of Patent: Aug. 28, 2012

(54) AERATOR HAVING FLEXIBLE FRAME

(75) Inventors: Kenneth E. Hunt, Rock Hill, SC (US); Shane D. Simon, Cascade, IA (US); Troy W. Harris, III, Charlotte, NC (US); Harlin J. Trefz, Jackson, TN (US); Ronald L. Reichen, Raleigh, NC (US); John L. Bocksnick, Willow Spring, NC (US); Bradley P. Aldridge, Raleigh, NC (US)

(73) Assignee: Deere & Company, Moline, IL (US)

( * ) Notice: Subject to any disclaimer, the term of this patent is extended or adjusted under 35 U.S.C. 154(b) by 210 days.

(21) Appl. No.: 12/713,755

(22) Filed: Feb. 26, 2010

(65) Prior Publication Data

US 2011/0213530 A1    Sep. 1, 2011

(51) Int. Cl.
*G06F 7/70* (2006.01)
(52) U.S. Cl. .............................. 701/50; 172/21; 172/22
(58) Field of Classification Search .................... 701/50; 172/21, 22
See application file for complete search history.

(56) References Cited

U.S. PATENT DOCUMENTS

| | | | |
|---|---|---|---|
| 5,704,200 A * | 1/1998 | Chmielewski et al. | 56/10.2 E |
| 5,797,458 A | 8/1998 | Simon et al. | |
| 5,988,290 A | 11/1999 | Banks | |
| 6,561,282 B2 | 5/2003 | Smith | |
| 6,615,570 B2 * | 9/2003 | Beck et al. | 56/10.2 E |
| 6,826,894 B2 * | 12/2004 | Thiemann et al. | 56/10.2 E |
| 6,948,568 B2 | 9/2005 | Banks | |
| 7,096,969 B2 | 8/2006 | Petersen et al. | |
| 7,267,181 B2 * | 9/2007 | Banks | 172/21 |
| 7,293,612 B1 * | 11/2007 | Petersen et al. | 172/22 |
| 7,472,759 B2 | 1/2009 | Petersen | |
| 7,730,960 B1 * | 6/2010 | Knight et al. | 172/21 |
| 2003/0019199 A1 * | 1/2003 | Fontanes et al. | 56/16.7 |
| 2008/0257571 A1 * | 10/2008 | Keane et al. | 172/21 |
| 2009/0188226 A1 * | 7/2009 | Carlson | 56/10.2 R |

FOREIGN PATENT DOCUMENTS

WO     2004016070     2/2004

OTHER PUBLICATIONS

Patented Flexi-Link system provides the ultimate in productivity without sacrificing hole quality. Deere & Company Product catalog [online]. [Retrieved on Feb. 26, 2010]. Retrieved from the Internet:<URL: http://www.deere.com/en_US/ProductCatalog/GT/servlet/com.deere.u90785.cce.productcatalog.view.servlets.ProdCatProduct? pNbr=4560M&tM=GT>.

(Continued)

*Primary Examiner* — James P Trammell
*Assistant Examiner* — Truc M Do

(57) ABSTRACT

An aerator having a flexible frame for use on sloped or undulating ground surfaces of golf courses and other turf. The aerator includes a pair of frame sections linked together at a horizontal pivot axis, one of the frame section supporting a coring head. A ground sensor is pivotably attached to one of the frame sections so that the ground sensor may pivot in response to changes in ground slope and provide output relating to the magnitude of the change. Based on the output, a flex frame actuator pivots the pair of frame sections with respect to each other.

16 Claims, 4 Drawing Sheets

OTHER PUBLICATIONS

Adjustable turf guards allow the Aercore 800 turf guard pressure to be compensated to match any turf condition. Deere & Company Product catalog [online]. [Retrieved on Feb. 26, 2010]. Retrieved from the Internet<URL: http://www.deere.com/en_US/ProductCatalog/GT/servlet/com.deere.u90785.cce.productcatalog.view.servlets.ProdCatProduct? pNbr=4560M&tM=GT>.

Electrohydraulic lift system allows for lifting coring head without the engine running. Deere & Company Product catalog [online]. [Retrieved on Feb. 26, 2010]. Retrieved from the Internet:<URL: http//www.deere.com/en_US/ProductCatalog/GT/servlet/com.deere.u90785.cce.productcatalog.view.servlets.ProdCatProduct?pNbr=4560M&tM=GT>.

* cited by examiner

AERATOR HAVING FLEXIBLE FRAME

FIELD OF THE INVENTION

This invention relates to aerators for aerating ground surfaces. More specifically, the invention relates to an aerator that provides holes with more consistent depth that are perpendicular to sloped or undulating ground surfaces such as golf courses.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have tines that repeatedly penetrate the ground surface, forming a plurality of holes so that the ground surface is aerated, to improve growth of the grass or other material and enhance the condition of the surface for playing purposes.

In conducting this type of aeration of turf surfaces, the neatness of the holes made by the aerator tines can significantly affect the overall result. For example, in the case of golf greens and the like where the vegetation is short, a hole with rough edges or too large a hole can cause spot erosion, resulting in an undesirable dimple in the ground surface. This effect is aggravated when forward movement of the aerator differs from the speed of the coring head over the ground surface, causing the tines to rake across or break the ground surface.

To minimize rough edges of the holes, aerators may be designed to keep the tines substantially vertical for entry and withdrawal from horizontal ground surfaces. For example, aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical and produce holes by pulling up plugs or cylindrical cores of soil as the tines move by rotation of the flywheel.

Holes produced by aerator tines may be substantially vertical, and perpendicular to ground surfaces, when ground surfaces are horizontal. However, the holes may not be perpendicular to undulating or sloped surfaces. For example, golf courses may have undulations or steep slopes in need of aeration. While an aerator travels over undulations or slopes, the coring head may not be perpendicular to the ground surface and, as a result, the tines may enter and/or exit the ground at angles that are not perpendicular to the ground surface. As a result, the holes are not perpendicular to the ground surface, and may have rough edges and be subject to erosion. Additionally, if the tines are not perpendicular to the ground surface, they do not provide uniform hole depth. Nor do the tines provide uniform spacing between the holes.

The problem of tines that are not perpendicular to the ground surface also may be due to wider coring heads that are positioned rearwardly of the axle of the supporting wheels. If a coring head is mounted behind the supporting axle of the aerator, and the aerator's wheels ride over a rise in ground contour before the tines fully penetrate the ground, the holes will have a reduced depth. Conversely, if the wheels ride over a dip as the tines penetrate the ground, the tines will produce deeper holes.

U.S. Pat. No. 7,293,612 relates to a Walk Aerator with Ground Following Coring Head designed to adjust the vertical position of the coring head relative to the frame in response to changes in ground contour. If the skid assembly rotates sufficiently out of its horizontal position, a pivotal connecting rod attached to the skid assembly causes a switch actuator to depress either of a pair of limit switches. Each limit switch may actuate a hydraulic cylinder to raise or lower the height of the coring head on the frame. As the coring head moves up or down, however, the tines may not be perpendicular to the ground surface.

An aerator is needed that can produce holes that are perpendicular to undulating or sloped ground surfaces, and that have uniform depth and spacing.

SUMMARY OF THE INVENTION

An aerator that can produce holes perpendicular to undulating or sloped ground surfaces, with uniform depth and spacing. The aerator has a coring head with plurality of tines that move by a reciprocating motion to repeatedly penetrate a ground surface. The coring head is mounted on a flexible frame having a horizontal pivot axis. A flex frame actuator is provided to flex the frame on the horizontal pivot axis in response to electronic signals from a ground sensor so that the tines penetrate the ground surface at an angle that is perpendicular to the ground surface.

DESCRIPTION OF THE PREFERRED EMBODIMENT

Figure 1:
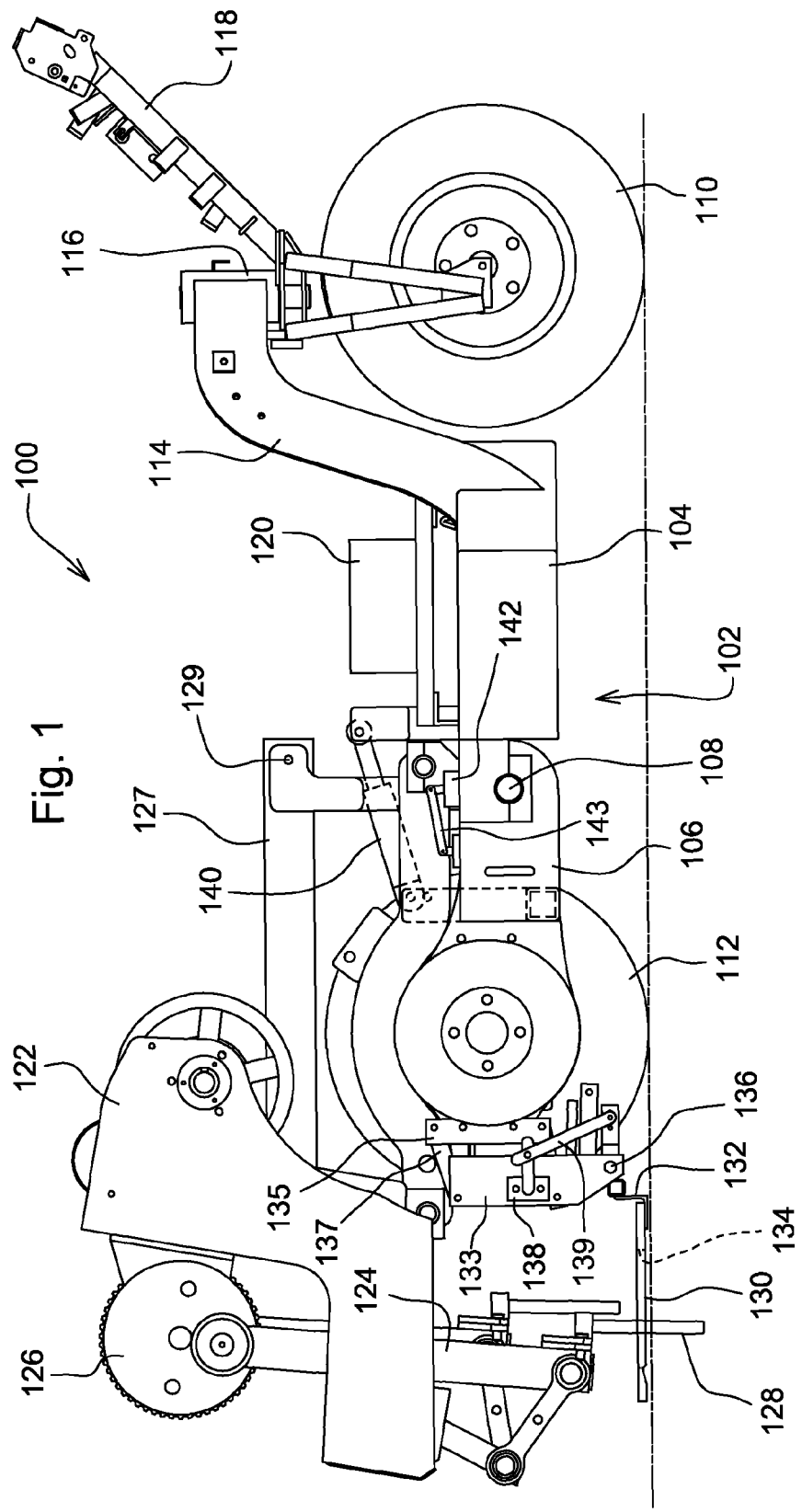
FIG. 1 is a side view of an aerator having a flexible frame according to a first embodiment of the invention, with the ground sensor within the neutral range and the flex frame in a un-flexed position.
Figure 2:
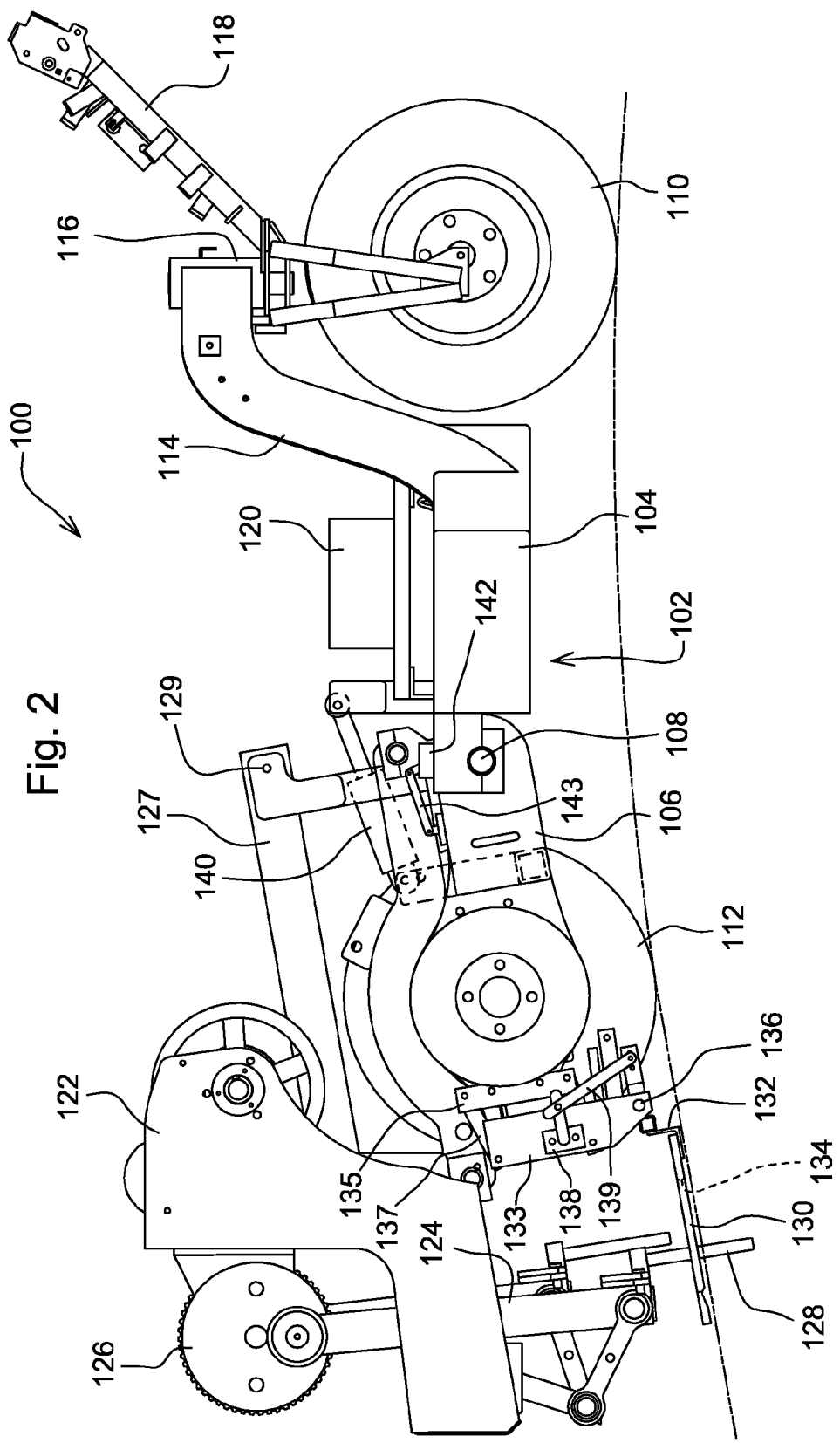
FIG. 2 is a side view of an aerator having a flexible frame according to the first embodiment, with the ground sensor below the neutral range and the flex frame adjusted upwardly.
Figure 3:
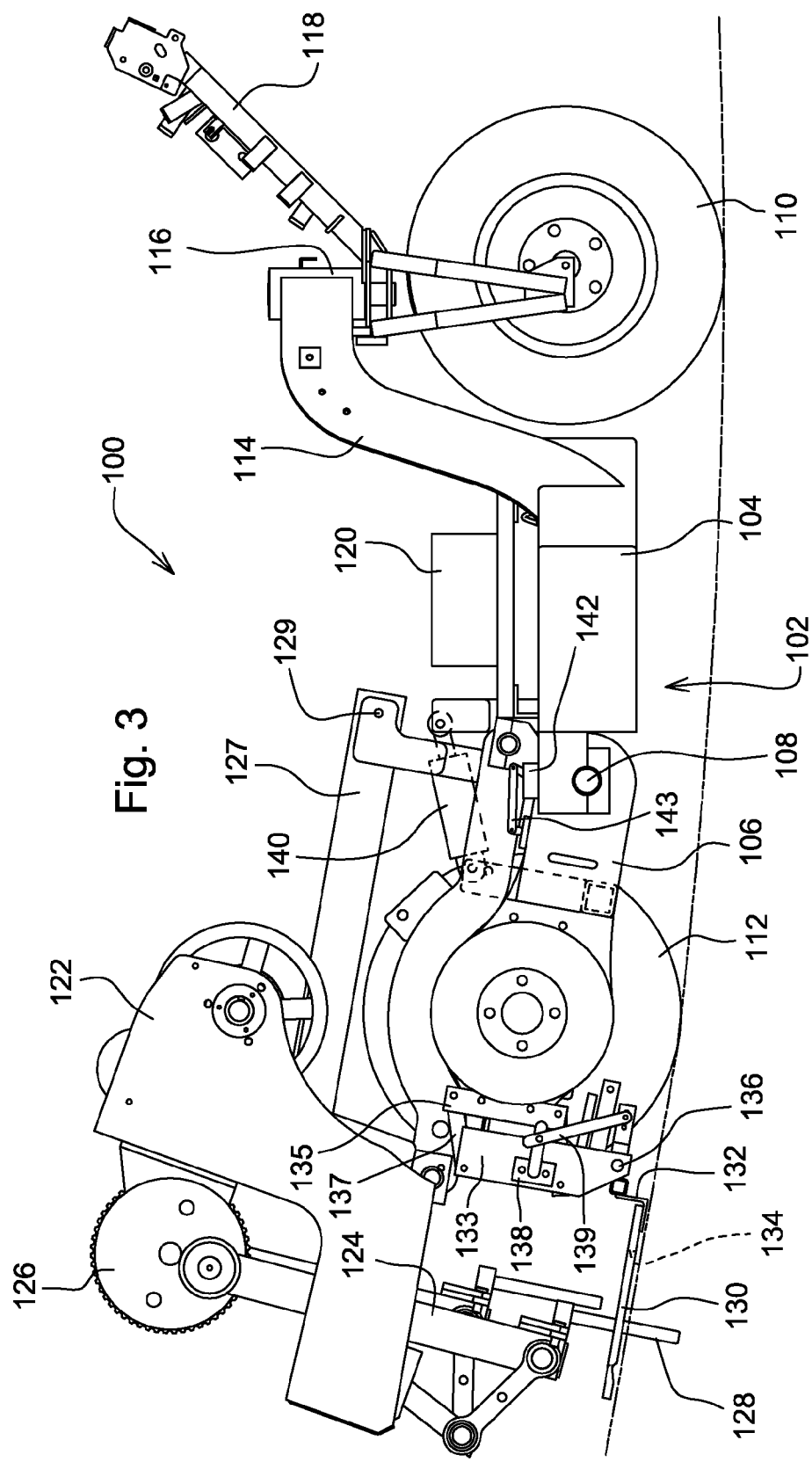
FIG. 3 is a side view of an aerator having a flexible frame according to the first embodiment, with the ground sensor above the neutral range and the flex frame adjusted downwardly.

FIGS. 1-3 show a first embodiment of aerator 100 having a flexible frame 102. The flexible frame may include a first or forward frame section 104 linked to second or rear frame section 106 at hinge or pivot point 108. The first and second frame sections are supported for movement over the ground by a single steerable wheel 110 mounted to the first frame section, which may or may not be driven, and a pair of driven wheels 112 mounted to the second frame section.

In one embodiment, pivot point 108 is located between the first and second frame sections, and provides a horizontal pivot axis perpendicular to the flexible frame aerator's direction of travel. The first frame section 104 may have a neck 114 extending upwardly therefrom, and the single steerable wheel may be carried in a pivotal yoke 116 that can rotate about a vertical pivot axis attached to the neck. An upwardly and forwardly extending handle assembly 118 may be coupled to the pivotal yoke that carries the front wheel, and may include operator controls that are connected to an electronic vehicle control unit 120. An operator may walk ahead of the flexible frame aerator and steer the vehicle by using the handle assembly to pivot the single steerable front wheel about the vertical pivot axis.

In one embodiment, coring head 122 may be mounted on the second frame section 106 at the rear of the flexible frame aerator, either behind the rear drive wheels and tires, between the rear drive wheels and tires, or adjacent the rear axle(s). The coring head may carry a plurality of tine assemblies 124 that reciprocate up and down by rotation of crankshaft 126. Each tine assembly may have a plurality of hollow or solid coring tines 128 that are driven into the ground and produce holes for the purpose of aerating the turf. Each tine assembly may include a rubber dampener system that absorbs the forward motion of the aerator to help improve hole quality by minimizing hole elongation. The coring head may be raised to a transport position or lowered to a coring position using an electrohydraulic lift and lower system. An electric motor turns a hydraulic pump to engage a hydraulic cylinder for raising and lowering the coring head that is supported by arms 127 on pivot axis 129. In FIGS. 1-3, the coring head is shown in the lowered position.

In one embodiment, the flexible frame aerator may include one or more turf guards 130 which are slotted plates that slide along the ground surface. The turf guard(s) may be attached to turf guard bracket 132 which is aligned transversely to the flexible frame aerator's direction of travel and may be pivotably attached to the frame. Each turf guard may have a plurality of slots 134 through which the hollow coring tines reciprocate to make holes in the turf. The turf guard holds the turf in place so that when the tines pull out of the ground, the turf around each hole does not lift with them. The turf guard may be spring loaded to provide positive and firm support for the tines as they pull out of the ground, and the pressure may be adjusted to lighter tension for soft conditions, or greater tension for firm conditions. The turf guard may be constructed of plastic or metal, and the bottom of the turf guard may be beveled to help slide along the ground surface as the flexible frame aerator travels, without grabbing back edges of the holes.

In one embodiment, turf guard 130 and turf guard bracket 132 are pivotably mounted to sub frame 133. The turf guard sub frame 133 may be mounted to rear frame member 135 using lost motion linkage 137. The linkage may be used to raise or lower the turf guard sub frame together with the coring head, so that the turf guard may be moved between a transport position and a coring position.

In one embodiment, while the turf guard is in the coring position, it pivots on axis 136 either in a first direction when encountering a hill or rise, or in a second direction when encountering a dip in the ground surface. The pivot axis is horizontal and perpendicular to the direction of travel of the machine.

In one embodiment, the turf guard may be mechanically linked to ground slope sensor 138 that senses angular change or displacement. For example, the ground slope sensor may be a potentiometer, an encoder, a Hall sensor or other device that provides output relating to the angular change or displacement of the turf guard. As the turf guard encounters a slope and pivots on axis 136, it moves the sensor an amount corresponding to the change in slope.

In one embodiment, the output from the ground slope sensor may be provided directly to frame flex actuator 140 which flexes the vehicle frame in relation to the change in slope. For example, the ground slope sensor may be linked to a hydraulic valve that controls a hydraulic frame flex actuator.

In one embodiment, the turf guard may be connected to ground slope sensor 138 through arms 139, and the sensor may be a potentiometer that provides an output signal regarding the slope to vehicle control unit 120. The output signal may be based on the angular position or inclination of the turf guard, which may be provided to the vehicle control unit at regular intervals such as every 10 milliseconds. For example, the turf guard travel may be 11.625 inches over 35 degrees at the rear tip, and the ground sensing potentiometer may have an input voltage of 5 VDC and provide an analog input to the vehicle control unit, which is then converted by the vehicle control unit to a digital quantity representing turf guard travel in counts per inch.

Alternatively, instead of a ground slope sensor linked to the turf guard, the sensor may be attached to the same portion of the frame as the coring head, but not necessarily attached to the coring head. Thus, the sensor may be any ground following device attached to the first or second frame sections of the flexible frame aerator for sensing changes in slope of the surface being aerated. For example, the sensor may include a ground following roller attached to the flexible frame aerator, instead of a sliding turf guard.

In one embodiment, vehicle control unit 120 may use input from ground sensor 138 to determine how much to flex the aerator frame. More specifically, the vehicle control unit may be programmed and configured to flex the frame sufficiently to assure that the coring tines enter and exit the ground perpendicular to the ground surface, regardless of the slope of the ground surface. For example, the vehicle control unit may flex the frame such that the second frame section, where the coring head is mounted, is parallel to the ground.

In one embodiment, vehicle control unit 120 may provide commands to frame flex actuator 140 to flex the aerator frame. The commands from the vehicle control unit are based on ground sensor inputs as it encounters a rise or fall of the ground surface. The frame flex actuator may be a hydraulic cylinder which may extend and retract between the first and second frame sections, or an electric actuator that may flex the first and second frame sections with respect to each other. The frame flex actuator may flex the frame about horizontal pivot axis 108 that is transverse to the flexible frame aerator's direction of travel.

In one embodiment, the flexible frame aerator may include frame flex sensor 142 which may be positioned between the first and second frame sections. The frame flex sensor may be a potentiometer, encoder, Hall effect sensor or other device that senses angular displacement. The frame flex sensor may be connected through arms 143 to the frame and may provide signals to indicate the angular position of the first frame section relative to the second frame section. The frame flex sensor may provide output to vehicle control unit 120. For example, the frame flex sensor travel distance may be about plus or minus 2 inches, and plus or minus about 10 degrees, from a neutral position, and the frame flex potentiometer may have an input voltage of 5 VDC and provide an analog input to the vehicle control unit, which is then converted by the vehicle control unit to a digital quantity representing turf guard travel in counts per inch.

In one embodiment, the flexible frame aerator may have an internal combustion engine, one or more batteries, and/or any other power source that may be used to operate coring head 122 and provide traction drive for the rear wheels. The internal combustion engine may also drive an alternator to generate electric power, a mechanical or hydrostatic transmission to connect each power source to one or more of the rear wheels. In the case of a hydrostatic transmission, a pump may supply pressurized fluid to a single hydraulic motor or pair of hydraulic motors for rotating the rear wheels. If the flexible frame aerator has an electric traction drive system, an electric drive motor on each rear wheel may be connected by cables to batteries or the electric power supply.

Figure 4:
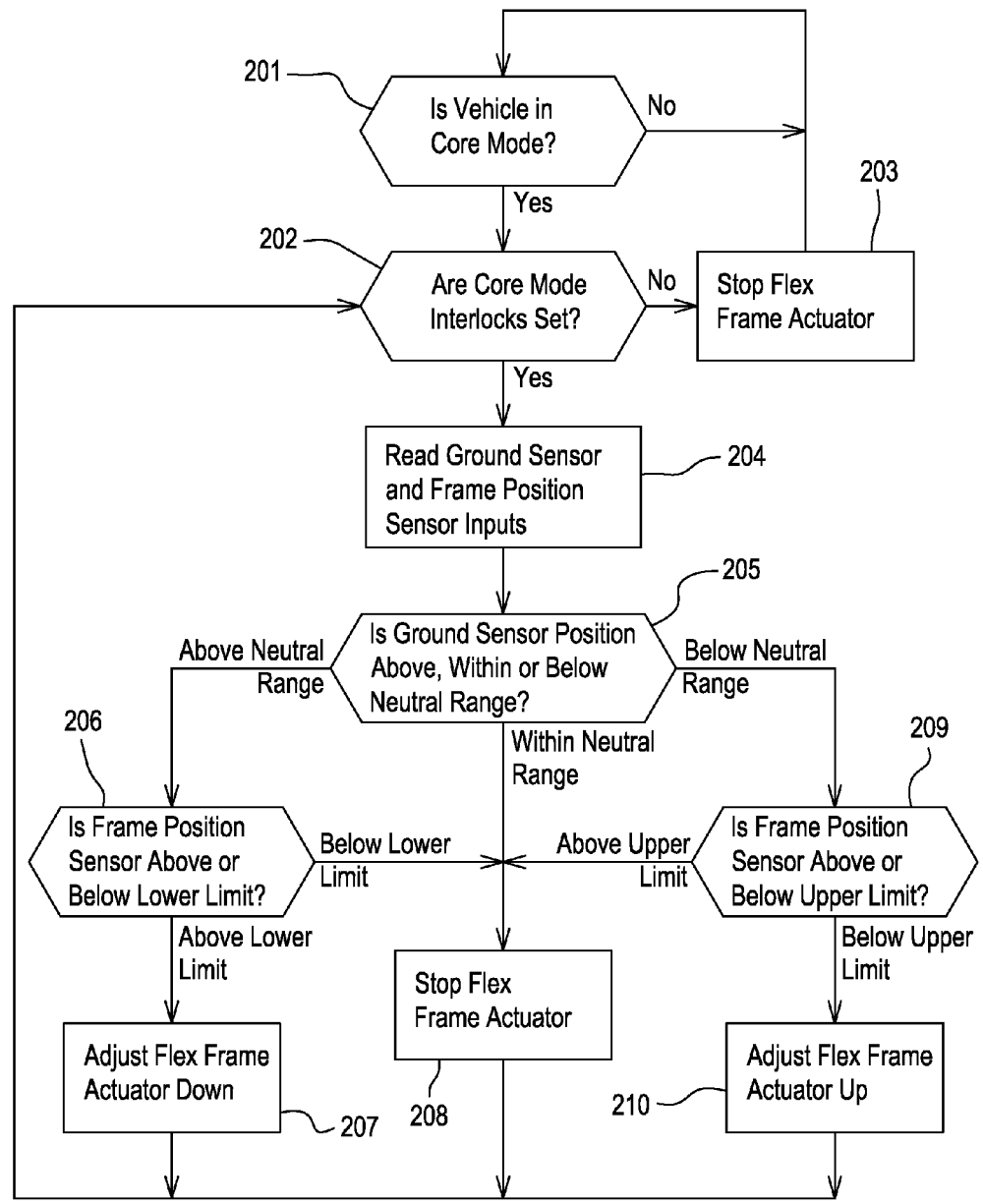
FIG. 4 is a flowchart of a system for flexing an aerator frame according to the first embodiment.

A preferred system of operating the flexible frame aerator is shown in the flowchart of FIG. 4. In block 201, the vehicle control unit checks if the vehicle is in core mode by reading inputs from the operator controls. If the vehicle is not in the core mode, the vehicle control unit provides a stop frame flex command in block 202, turning off the frame flex actuator. If the operator control inputs show the vehicle is in core mode, the vehicle control unit checks if the core mode interlocks are set in block 203. Examples of core mode interlocks include an operator presence system and parking brake. If the core mode interlocks are not set, the vehicle control unit provides a stop frame flex command in block 202. If the core mode interlocks are set, the vehicle control unit reads the input of the ground sensor in block 204.

The vehicle control unit determines if the ground sensor input is above, within, or below a pre-specified neutral range in block 205. For example, the ground sensor may be a potentiometer that senses the angular position of the pivoting turf guard. The neutral range may be a vertical displacement of plus or minus about ¼ inch from zero, or an angular displacement of plus or minus between about 1 degree and about 2 degrees from zero. The neutral range may be provided so that noise does not result in a false indication of a change in slope.

If the ground sensor position is above the neutral range, the vehicle control unit determines if the frame position sensor is either above or below a pre-specified lower limit in block 206. For example, the lower limit for a potentiometer sensing the angular position of the first frame section relative to the second frame section may be a linear distance of about 2 inches, or about 10 degrees, below a neutral position. If the frame position sensor is above the lower limit, the vehicle control unit sends a command to adjust the flex frame actuator down in block 207. If the frame position sensor is below the lower limit, the vehicle control unit provides a command to stop the flex frame actuator in block 208 and then returns to block 202.

If the ground sensor position is within the neutral range, the vehicle control unit commands the flex frame actuator to stop in block 208 and then returns to block 202.

If the ground sensor position is lower than the neutral range, the vehicle control unit determines if the frame position sensor is either above or below a pre-specified upper limit in block 209. For example, the upper limit for a potentiometer sensing the angular position of the first frame section relative to the second frame section may be a linear distance of about 2 inches, or about 10 degrees, above a neutral position. If the frame position sensor is below the upper limit, the vehicle control unit sends a command to adjust the flex frame actuator up in block 210. If the frame position sensor is above the upper limit, the vehicle control unit commands the flex frame actuator to stop in block 208 and then returns to block 202.

Having described the preferred embodiment, it will become apparent that various modifications can be made without departing from the scope of the invention as defined in the accompanying claims.

The invention claimed is:

1. An aerator comprising:
    a first frame section having a neck extending upwardly therefrom with a handle assembly coupled to a pivotal yoke carrying a steerable front wheel that rotates about a vertical pivot axis; the first frame section connected on a horizontal pivot axis to a second frame section supported by a pair of driven wheels;
    a turf guard pivotably mounted to the second frame section and having a plurality of slots through which a plurality of coring tines reciprocate to make holes in the turf;
    a potentiometer connected to the turf guard and providing output regarding the pivot angle of the turf guard;
    a flex frame actuator connected between the first frame section and the second frame section;
    the flex frame actuator flexing the frame to an angular position in response to the output from the ground sensor.

2. The aerator of claim 1 further comprising a vehicle control unit receiving the output from the potentiometer and providing angular position commands to the flex frame actuator.

3. The aerator of claim 1 further comprising a frame flex sensor connected between the first frame section and the second frame section and providing output to the vehicle control unit regarding the angular position of the first frame section relative to the second frame section.

4. The aerator of claim 1 wherein the flex frame actuator is a hydraulic cylinder.

5. The aerator of claim 1 wherein the flex frame actuator is an electric actuator.

6. The aerator of claim 1 wherein the flex frame actuator flexes only if the output from the potentiometer is outside a neutral range.

7. The aerator of claim 1 wherein the flex frame actuator flexes only if the output from the potentiometer is above a lower limit and below an upper limit.

8. An aerator comprising:
    a coring head having a plurality of tines that move by a reciprocating motion to repeatedly penetrate a ground surface;
    a turf guard pivotably mounted on the aerator and having a plurality of slots through which the tines move to penetrate the ground surface;
    a flexible frame on which the coring head is mounted; the flexible frame having a horizontal pivot axis intermediate the flexible frame between a forward frame section supported by a single wheel steered by a handle assembly and a rear frame section supported by a pair of driven wheels; and
    a flex frame actuator to flex the frame on the horizontal pivot axis in response to signals from the turf guard so that the tines penetrate the ground surface at an angle that is perpendicular to the ground surface.

9. The aerator of claim 8 wherein the turf guard slides along the ground surface and pivots in response to slope changes of the ground surface.

10. The aerator of claim 8 wherein the flex frame actuator is a hydraulic cylinder.

11. The aerator of claim 8 further comprising a flex frame sensor that provides signals indicating how much the frame has flexed.

12. An aerator comprising:
    a pair of frame sections linked together at a horizontal pivot axis; the pair of frame sections including a first frame section having an upwardly and forwardly extending handle assembly supported by an operator steered wheel and a second frame section supported by a pair of drive wheels and supporting a coring head;
    a turf guard having a plurality of slots through which coring tines are driven by the coring head; the turf guard pivotably attached to one of the frame sections so that the turf guard ground-sensor pivots in response to changes in slope and provides an electronic signal relating to the magnitude of the change; and
    an electronic control unit receiving the electronic signal and using that electronic signal to provide commands to a flex frame actuator that pivots the pair of frame sections with respect to each other.

13. The aerator of claim 12 wherein the flex frame actuator pivots the pair of frame sections to align the coring head to be parallel to the ground surface.

14. The aerator of claim 12 wherein the flex frame actuator is a hydraulic cylinder.

15. The aerator of claim 12 wherein the flex frame actuator is an electric actuator.

16. The aerator of claim 12 further comprising a flex frame sensor pivotably attached between the pair of frame sections.

* * * * *